US011956497B2

(12) United States Patent
Wei et al.

(10) Patent No.: US 11,956,497 B2
(45) Date of Patent: Apr. 9, 2024

(54) AUDIO PROCESSING METHOD AND ELECTRONIC DEVICE

(71) Applicant: VIDAA (NETHERLANDS) INTERNATIONAL HOLDINGS, B.V., Duiven (NL)

(72) Inventors: Jiande Wei, Qingdao (CN); Zhenju Wang, Qingdao (CN)

(73) Assignee: VIDAA (NETHERLANDS) INTERNATIONAL HOLDINGS, B.V., Duiven (NL)

( * ) Notice: Subject to any disclaimer, the term of this patent is extended or adjusted under 35 U.S.C. 154(b) by 408 days.

(21) Appl. No.: 17/347,372

(22) Filed: Jun. 14, 2021

(65) Prior Publication Data
US 2021/0306699 A1 Sep. 30, 2021

Related U.S. Application Data

(63) Continuation of application No. PCT/CN2020/083613, filed on Apr. 8, 2020.

(30) Foreign Application Priority Data

May 23, 2019 (CN) .......................... 201910433524.2

(51) Int. Cl.
*H04N 21/439* (2011.01)
*G09B 21/00* (2006.01)
(Continued)

(52) U.S. Cl.
CPC ......... *H04N 21/439* (2013.01); *G09B 21/006* (2013.01); *H04N 5/607* (2013.01); *H04R 1/10* (2013.01); *H04R 2420/07* (2013.01)

(58) Field of Classification Search
CPC .... H04N 21/439; H04N 5/607; G09B 21/006; H04R 1/10; H04R 2420/07
(Continued)

(56) References Cited

U.S. PATENT DOCUMENTS 9,294,207 B2 * 3/2016 Taufour ................... H04R 3/12
10,177,728 B2 * 1/2019 Son .......................... H03G 5/025
2010/0002135 A1 * 1/2010 Dodd ............... H04N 21/42204
348/553

FOREIGN PATENT DOCUMENTS

CN 101458951 A * 6/2009 .......... G11B 27/031
CN 101877806 A 11/2010
(Continued)

OTHER PUBLICATIONS

The first Office Action of the priority CN application.
International Search Report of PCT/CN2020/083613.

*Primary Examiner* — Trang U Tran
(74) *Attorney, Agent, or Firm* — J.C. PATENTS

(57) ABSTRACT

Embodiments of the present application disclose a method for audio and video processing and an electronic device. A first decoding result corresponding to main channel audio and a second decoding result corresponding to audio description are acquired according to audio data in an audio and video file; and the first decoding result as well as an audio mixed result of the first decoding result and the second decoding result are output respectively through different audio output devices, so that in a scenario where a normal user and a visually impaired user watch audio and video at the same time, the normal user and the visually impaired user can select different audio output devices for audio listening to ensure that the two do not affect each other, which satisfies the needs of the normal user and the visually impaired user to watch at the same time.

8 Claims, 12 Drawing Sheets

(51) Int. Cl.
*H04N 5/60* (2006.01)
*H04R 1/10* (2006.01)

(58) Field of Classification Search
USPC .......................................................... 348/62
See application file for complete search history.

(56) References Cited

FOREIGN PATENT DOCUMENTS

| | | | |
|---|---|---|---|
| CN | 201663649 | U | 12/2010 |
| CN | 103179451 | A | 6/2013 |
| CN | 105245938 | A | 1/2016 |
| CN | 109275027 | A | 1/2019 |
| CN | 110139151 | A | 8/2019 |
| EP | 2144438 | A1 | 1/2010 |

\* cited by examiner

Visually impaired person

AUDIO PROCESSING METHOD AND ELECTRONIC DEVICE

CROSS-REFERENCE TO RELATED APPLICATIONS

This application is a continuation of International Application No. PCT/CN2020/083613, filed on Apr. 8, 2020, which claims priority to Chinese patent application No. 201910433524.2, entitled "Audio Data Processing Method and Electronic Device" and filed on May 23, 2019. Both of the above applications are hereby incorporated by reference in their entireties.

TECHNICAL FIELD

Some embodiments of the present application relate to the field of multimedia technology, and in particular to an audio processing method and an electronic device.

BACKGROUND

With the development of multimedia technology, people are becoming more and more interested in acquiring information through movies and television programs. For ordinary people, they can listen to audio of the program through their ears and watch video images of the program through their eyes. However, for visually impaired people, they can only listen to the audio of the program and cannot watch the video images, which reduces the perceptual experience for the video program.

In digital television (Digital television, DTV) service, in order to improve the perception experience of visually impaired people for the video programs, a channel of audio description is added into audio data of the DTV service. The audio description refers to audio data associated with an analysis of the content of the current video image. When visually impaired people "watch" television, while listening to main channel audio of the movies or television programs, they can also perceive video images of the video programs by listening to the audio description.

SUMMARY

Some embodiments of the present application provide an audio processing method and an electronic device to satisfy needs of a normal user and a visually impaired user to watch video programs at the same time.

According to a first aspect, some embodiments of the present application provide an audio processing method, including: acquiring a first decoding result corresponding to main channel audio and a second decoding result corresponding to audio description according to audio data in an audio and video file, where the main channel audio is audio data of the audio and video file itself, and the audio description is audio data describing content of a video picture in the audio and video file; outputting the first decoding result as well as an audio mixed result of the first decoding result and the second decoding result respectively through different audio output devices.

According to a second aspect, some embodiments of the present application provide an audio processing method, including: receiving an audio and video file, where the audio and video file includes main channel audio and audio description; when a headphone is connected, causing the main channel audio and the audio description to be output to the headphone, and causing the main channel audio to be output to a speaker; and when no headphone is connected, causing the main channel audio and the audio description to be output to a speaker.

According to a third aspect, some embodiments of the present application provide an electronic device, including: a speaker; and a processor connected to the speaker, where the processor is configured to:

receive an audio and video file, where the audio and video file includes main channel audio and audio description, where the audio description is audio data describing content of a video image in the audio and video file, and the main channel audio is audio data other than the audio description in the audio and video file;

when a headphone is connected, cause the main channel audio and the audio description to be output to the headphone, and cause the main channel audio to be output to the speaker; and when no headphone is connected, cause the main channel audio and the audio description to be output to the speaker.

According to a fourth aspect, some embodiments of the present application provide an electronic device, including: a speaker; and a processor connected to the speaker, where the processor is configured to:

receive an audio and video file, where the audio and video file includes main channel audio and audio description, where the main channel audio is audio data of the audio and video file itself, and the audio description is audio data describing content of a video image in the audio and video file;

when a headphone is connected, cause the main channel audio and the audio description to be output to the headphone, and cause the main channel audio to be output to the speaker.

According to a fifth aspect, some embodiments of the present application provide an electronic device, including:

a decoder, configured to acquire a first decoding result corresponding to main channel audio and a second decoding result corresponding to audio description according to audio data in an audio and video file, where the main channel audio is audio data of the audio and video file itself, and the audio description is audio data describing content of a video image in the audio and video file; and an audio mixer, configured to output the first decoding result as well as an audio mixed result of the first decoding result and the second decoding result respectively through different audio output devices.

According to a sixth aspect, some embodiments of the present application provide a computer-readable storage medium, where the computer-readable storage medium includes computer programs, and when the computer programs are executed by a processor to perform the method according to any one of the first aspect.

According to the audio processing method and electronic device in some embodiments of the present application, the first decoding result corresponding to the main channel audio and the second decoding result corresponding to the audio description are acquired according to the audio data in the audio and video file. The first decoding result as well as the audio mixed result of the first decoding result and the second decoding result are output respectively through different audio output devices, so that in a scenario where a normal user and a visually impaired user watch audio and video at the same time, the normal user and visually impaired user can select different audio output devices for audio listening to ensure that the two do not affect each

DESCRIPTION OF EMBODIMENTS

The following describes the technical solutions in embodiments of the present application clearly and comprehensively with reference to the accompanying drawings in some embodiments of the present application. Apparently, the described embodiments are merely a part rather than all embodiments of the present application. All other embodiments obtained by those of ordinary skill in the art based on embodiments of the present application without creative effort shall fall within the protection scope of the present application.

The terms "first", "second", "third", "fourth" and the like (if any) in the description and claims as well as the above-mentioned drawings of the present application are used to distinguish similar objects, rather than to indicate a specific order or sequence. It should be understood that the terms used in this way can be interchanged if necessary, so that the embodiments of the present application described herein, for example can be implemented in a sequence other than those illustrated or described herein. In addition, the terms "comprise/include" and "have" and any variations thereof are intended to cover non-exclusive inclusions. For example, processes, methods, systems, products, or devices that include a series of steps or units are not necessarily limited to those steps or units clearly listed, but may include other steps or units that are not clearly listed or the steps or units inherent to these processes, methods, products, or devices.

Figure 1:
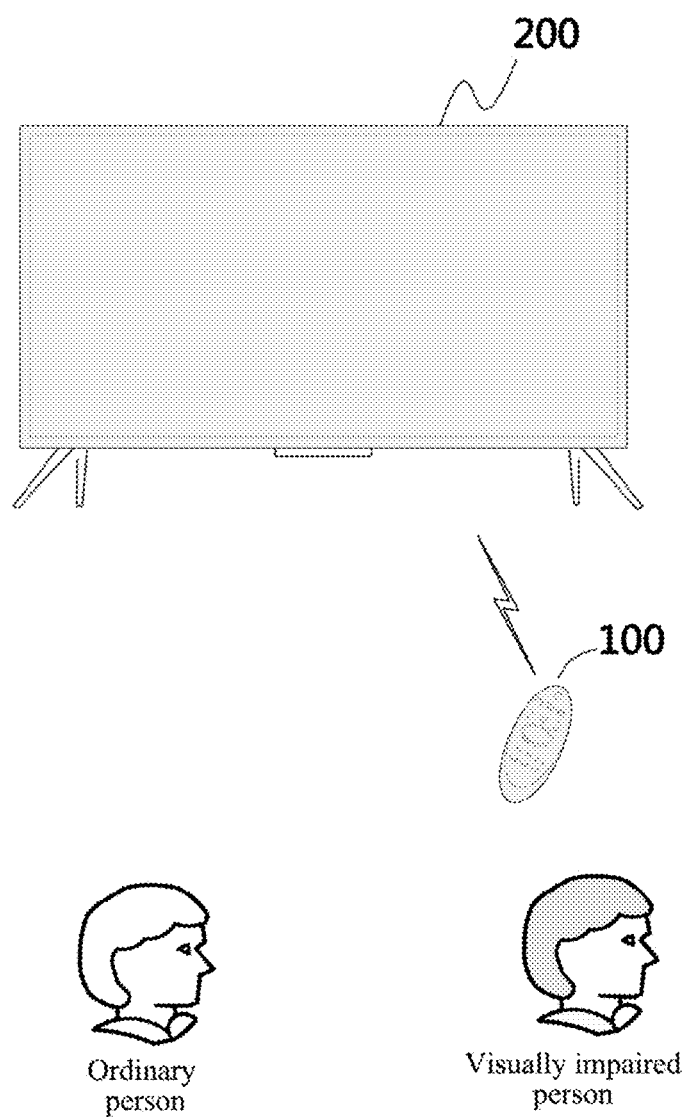
FIG. 1 is a schematic diagram of an application scenario in some embodiments of the present application.

FIG. 1 is a schematic diagram of an application scenario where some embodiments of the present application apply. As shown in FIG. 1, in this application scenario, at least one user watches a video program through an electronic device 200. The electronic device 200 may be any electronic device with a multimedia playing function, including but not limited to: a television, a mobile phone, a tablet computer, a desktop computer, etc. Exemplarily, FIG. 1 illustrates a case where the electronic device is a television. When watching a film or television program through the electronic device, the user can use a remote control 100 to select a film or television program, and can also use the remote control 100 to control a playing state of the film or television program, for example, to start playing, pause playing, adjust volume, switch a watch mode, etc.

It can be understood that, in order to enrich the perception experience of the user for movies and television programs, the video programs generally include video data and audio data. Therefore, for ordinary users, they can listen to audio of the program through their ears and watch video pictures of the program through their eyes. However, for blind people, they can only listen to the audio of the program and cannot watch the video pictures, which reduces the perceptual experience for the video program.

For current DTV service, in order to improve the perception experience of blind or visually impaired people for movies s and television programs, a special audio is added into audio data of the DTV service, and the special audio is used to describe content of the current video. For the convenience of description, in some embodiments of the present application, the audio data of the movie and television program itself is called main channel audio, and the audio data for describing the content of the current video is called audio description. In other words, in the DTV service, the audio data of the movie and television program includes two parts, namely the main channel audio and the audio description.

In a scenario, if the user watching the movie and television program in FIG. 1 is an ordinary person, the user can set a watch mode of the movie and television program to a normal mode through a remote control. Under this mode, the electronic device only outputs the main channel audio of the movie and television program, that is, to decode and output only the main channel audio.

In another scenario, if the user watching the video program in FIG. 1 is a visually impaired person, the user can switch the watch mode of the movie or television program to a mode for visually impaired through the remote control. Under this mode, the electronic device outputs the main channel audio and the audio description of the video program at the same time. In other words, while listening to the main channel audio of the movie and television program, the visually impaired person can also perceive a video picture of the movie and television program by listening to the audio description.

However, in the application scenario shown in FIG. 1, there may also be another scenario, for example: users watching the video program include both an ordinary person and a visually impaired person. Current DTV service cannot satisfy the need of the ordinary person and the visually impaired person to watch television at the same time.

Some embodiments of the present application provide an audio processing method, which can satisfy the need of an ordinary person and a visually impaired person to watch television at the same time.

The technical solutions of the present application will be described in detail below with specific embodiments. The following specific embodiments can be combined with each other, and the same or similar concepts or processes may not be repeated in some embodiments.

Figure 2:
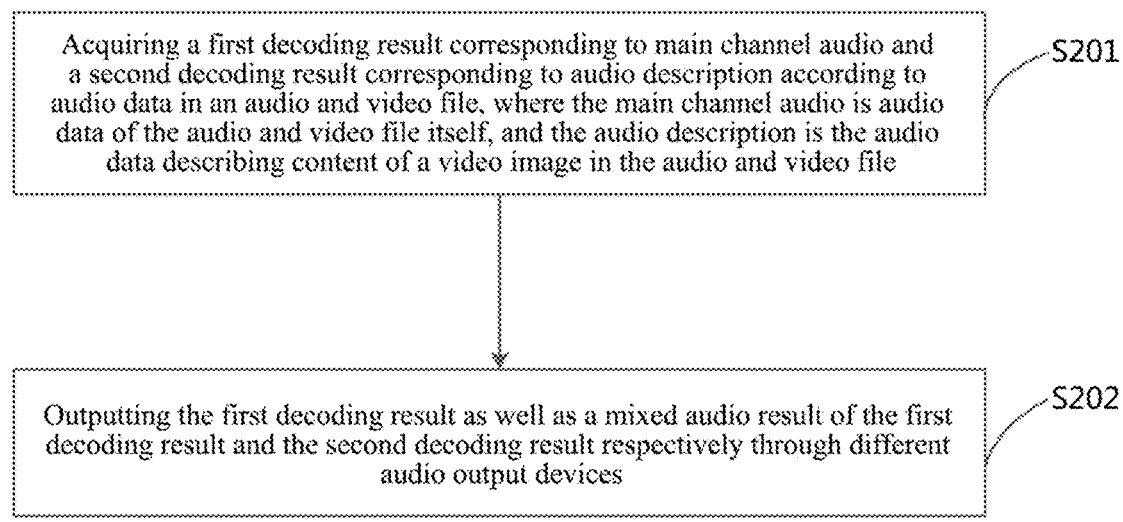
FIG. 2 is a schematic flowchart of an audio processing method according to an embodiment of the present application.

FIG. 2 is a schematic flowchart of an audio processing method according to an embodiment of the present application, and the method in some embodiments can be performed by the electronic device in FIG. 1. The electronic device may be any electronic device with a multimedia playing function, including but not limited to: a television, a mobile phone, a tablet computer, a desktop computer, etc.

As shown in FIG. 2, the method of some embodiments includes the following steps.

S201: Acquiring a first decoding result corresponding to main channel audio and a second decoding result corresponding to an audio description according to the audio data in an audio and video file, where the main channel audio is audio data of the audio and video file itself, and the audio description is the audio data describing content of a video image in the audio and video file.

In some embodiments, the main channel audio includes audio data that exists during an audio and video recording process, and the audio description is audio data added during a post-production process to help a visually impaired person understand content of a video image.

In some embodiments, remaining audio data after removing the audio description from data of the audio and video file is the main channel audio.

S202: Outputting the first decoding result as well as a mixed audio result of the first decoding result and the second decoding result respectively through different audio output devices.

Firstly, in some embodiments of the present application, the audio and video file refers to a multimedia file including audio data and video data. The audio and video file can be played through the electronic device for users to watch. Exemplarily, the audio and video file may be a video clip made by a user, or a movie and television program. For the convenience of description, in the following description of some embodiments of the present application, a video program is taken as an example for description.

Generally, an electronic device that supports multimedia playing usually includes the following devices: a controller, a demodulator, a decoder and an audio mixer, where the controller is connected to the demodulator, the decoder and the audio mixer, respectively, for controlling processing of the demodulator, the decoder and the audio mixer. A data processing when the electronic device plays a video program will be described below in combination with the above-mentioned devices.

When the electronic device plays a video program, the controller determines a video program to be played according to a playing instruction input from the user through the remote control. A stream of the video program is acquired from a server, where the stream is obtained by encoding original data of the video program according to a protocol. Taking the DTV service as an example, the stream of the video program obtained by the electronic device from the server is a stream encoded with a protocol associated with DTV. The electronic device cannot directly play stream data, but needs to perform a series of processing on the stream data.

In some embodiments, the stream data of the video program is obtained by modulating video data and audio data using a certain modulation approach. The electronic device processes and plays video data and audio data in different ways, therefore it is necessary to demodulate the stream data through the demodulator to obtain the video data and the audio data. For the audio data obtained from demodulation, the controller controls the decoder to decode the audio data to obtain audio suitable for playing. In some embodiments, the controller controls the audio mixer to perform audio mixing processing on the decoded audio, and then output it through an audio output device. The audio mixing processing may be synthesis processing on the decoded audio, or sound effect processing on the decoded audio.

In some embodiments, for S201, the decoder acquires the first decoding result corresponding to the main channel audio and the second decoding result corresponding to the audio description according to the audio data corresponding to the video program. The main channel audio is the audio data of the video program itself, and the audio description is the audio data describing the content of a video image of the video program.

It can be understood that the decoder in some embodiments may specifically be a Digital Signal Processor (DSP) chip responsible for audio decoding. The decoder can be configured to decode audio from multiple input sources, such as audio input from DTV interface, USB interface and, HDMI interface, etc.

The decoder in some embodiments needs to support simultaneous decoding of more than two audio channels. Taking DTV input audio as an example, the audio data of the video program includes the main channel audio and the audio description. After the decoder acquires the audio data, the decoder decodes the main channel audio and the audio description respectively to obtain the first decoding result corresponding to the main channel audio and the second decoding result corresponding to the audio description.

In some embodiments, for S202, the audio mixer outputs the first decoding result as well as the mixed audio result of the first decoding result and the second decoding result respectively through different audio output devices.

It can be understood that an ordinary person only needs to listen to the main channel audio when watching the video program, while a visually impaired person needs to listen to the main channel audio and the audio description at the same time when watching the video program. In some embodiments, in order to satisfy watching needs of both the ordinary person and the visually impaired person, the main channel audio is output through an audio output device 1, and the mixed audio result of the main channel audio and audio description is output through an audio output device 2. Therefore, the ordinary person can listen through the audio output device 1, and the visually impaired person can listen through the audio output device 2. It can be seen that even if the ordinary person and the visually impaired person watch the video program at the same time, they will not affect each other.

The audio output devices include: an audio output device built in the electronic device, and/or, an external audio output device connected to the electronic device. The audio output device built in the electronic device may be, for example, a speaker, and the external audio output device connected to the electronic device may be, for example, earphones, headphones or earbuds. In some embodiments, headphones, earphones and earbuds are examples of external audio output devices and can use interchangeably. The headphone may be wired or wireless. In some embodiments, the headphones may be Bluetooth headphones.

In some embodiments, there may be multiple kinds of audio output devices. Taking a speaker and a headphone as an example, in an implementation, the audio mixer can output the main channel audio through the speaker, and output the audio mixed result of the main channel audio and the audio description through the headphone. In this scenario, the ordinary person listens to the audio data through the speaker, the visually impaired person listens to the audio data through the headphone, and the two do not affect each other.

In another possible implementation, the audio mixer can also output the main channel audio through the headphone, and output the audio mixed result of the main channel audio and the audio description through the speaker. In this scenario, the ordinary person listens to the audio data through the headphone, the visually impaired person listens to the audio data through the speaker, and the two do not affect each other.

In some embodiments what the visually impaired person listens through the headphone or the speaker is the audio mixed result obtained by mixing the main channel audio and the audio description. Since the audio description is the audio data for explaining video images of the video program, the audio description and the video picture are synchronized. Meanwhile, the main channel audio and the video images of the video program are also synchronized. Therefore, in some embodiments, the main channel audio and the audio description are mixed and output to ensure synchronization of the two channels of audio heard by the visually impaired person.

It can be understood that in some embodiments, there is no specific limitation on which audio output device is specifically used for output, as long as the main channel audio, as well as the audio mixed result of the main channel audio and the audio description are output by different audio output devices. In an implementation, the electronic device can also receive an audio output strategy configured by the user, that is, the user can manually configure which audio output device outputs the main channel audio and which audio output device outputs the audio mixed result according to actual needs.

According to the audio processing method according to some embodiments, the first decoding result corresponding to the main channel audio and the second decoding result corresponding to the audio description are acquired according to the audio data in the video program. The first decoding result as well as the audio mixed result of the first decoding result and the second decoding result are output respectively through different audio output devices, so that in a scenario where an ordinary person and a visually impaired person watch the video program at the same time, the ordinary person and the visually impaired person can select different audio output devices for audio listening to ensure that the two do not affect each other, which satisfies the need of the ordinary person and the visually impaired person to watch at the same time.

In some embodiments, if the audio data includes the main channel audio and the audio description, if no headphone is connected, the electronic device outputs the main channel audio and the audio description through the speaker. In this case, it may be that only the visually impaired person is watching the video, and there is no need to process data separately.

Figure 3:
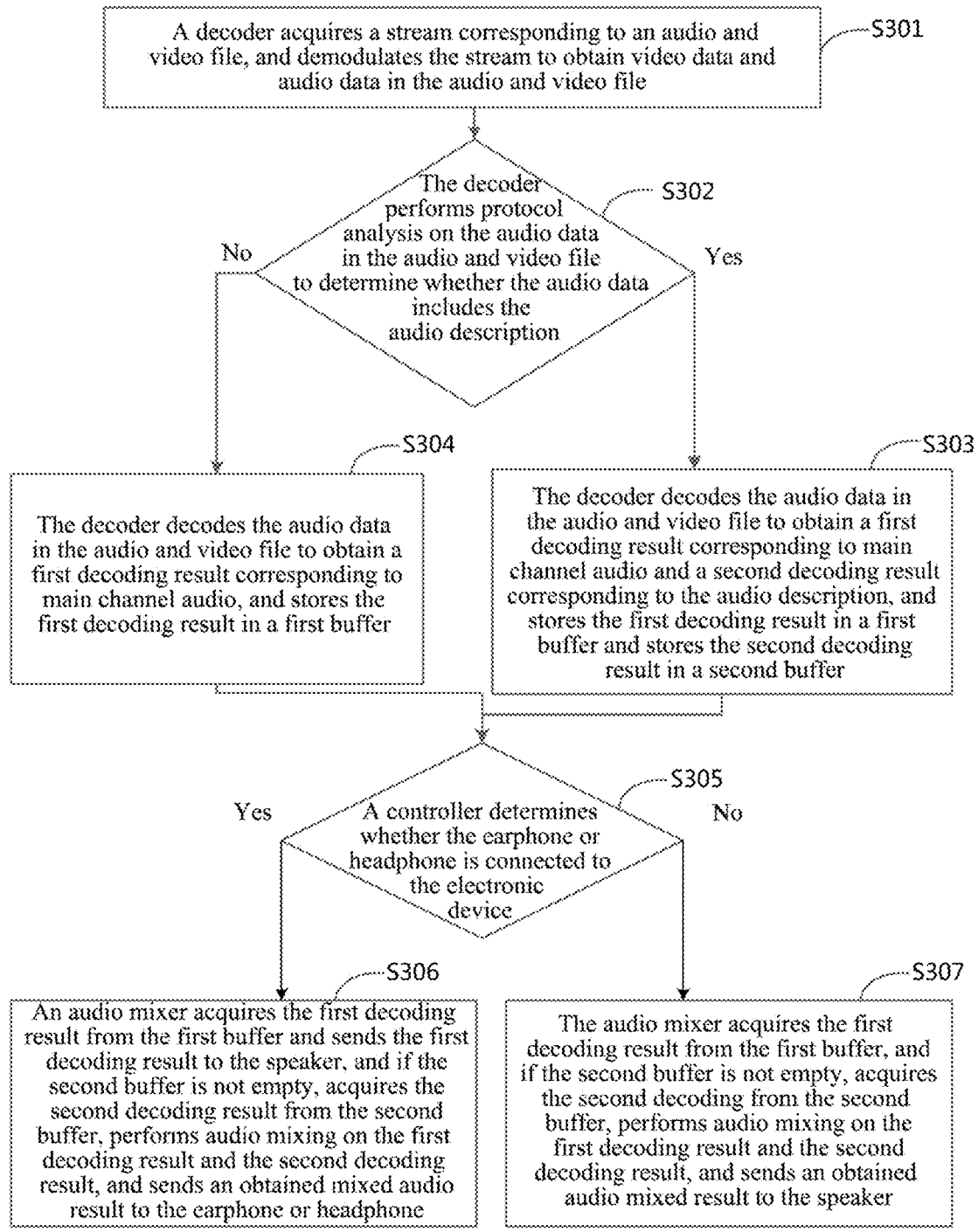
FIG. 3 is a schematic flowchart of an audio processing method according to another embodiment of the present application.

FIG. 3 is a schematic flowchart of an audio processing method according to another embodiment of the present application. Some embodiments are based on the abovementioned embodiments. In some embodiments, audio output devices are described by taking a speaker and earphones (or headphones) as an example.

As shown in FIG. 3, in some embodiments, the method includes the following steps.

S301: A decoder acquires a stream corresponding to an audio and video file, and demodulates the stream to obtain video data and audio data in the audio and video file.

S302: The decoder performs protocol analysis on the audio data in the audio and video file to determine whether the audio data includes audio description. If yes, the flow goes to S303, and if no, the flow goes to S304.

When it is determined that the audio data does not include the audio description according to a protocol analysis result, there is no need to decode the audio description, so as to improve processing efficiency of the decoder.

S303: The decoder decodes the audio data in the audio and video file to obtain a first decoding result corresponding to main channel audio and a second decoding result corresponding to the audio description, and stores the first decoding result in a first buffer and stores the second decoding result in a second buffer.

S304: The decoder decodes the audio data in the audio and video file to obtain a first decoding result corresponding to main channel audio, and stores the first decoding result in a first buffer.

S305: A controller determines whether the earphone or the headphone is connected to the electronic device, if yes, the flow goes to S306, if no, the flow goes to S307.

In some embodiments, the controller can detect whether an earphone or headphone is connected to the electronic device according to a connection mode and a connection protocol between the electronic device and the earphones or headphones. Exemplarily, taking Bluetooth earphones or headphones as an example, the controller can detect whether there are earphones or headphones among Bluetooth devices which have established a connection or paired with the electronic device.

S306: An audio mixer acquires the first decoding result from the first buffer and sends the first decoding result to the speaker, and if the second buffer is not empty, acquires the second decoding result from the second buffer, performs audio mixing on the first decoding result and the second decoding result, and sends an obtained mixed audio result to the earphone or headphone.

S307: The audio mixer acquires the first decoding result from the first buffer, and if the second buffer is not empty, acquires the second decoding from the second buffer, performs audio mixing on the first decoding result and the second decoding result, and sends an obtained audio mixed result to the speaker.

In some embodiments, when headphones are connected to the electronic device, the main channel audio is output through the speaker, and the audio mixed result of the main channel audio and the audio description is output through the headphone, so as to satisfy watching needs of an ordinary person and a visually impaired person at the same time. When no headphone is connected to the electronic device, the audio mixed result of the main channel audio and the audio description is output through the speaker, so that the watching needs of the visually impaired person is satisfied as much as possible in a case of not wearing the headphone.

In some embodiments, there may be no audio description for a certain period of time. In this case, there is no data in the second buffer, then the audio mixer directly outputs the first decoding result.

In some embodiments, before S305, the method further includes that: the controller acquires a current watch mode for the video program, and when it is determined that the current watch mode is a mode that supports watching by a visually impaired person, the flow goes to S305 to S307.

The watch mode of the video program includes: a mode that supports watching by a visually impaired person and a mode that does not support watching by a visually impaired person. A user can set the mode through a remote control. When the user selects the mode that supports watching by a visually impaired person, the electronic device will consider the watching need of the visually impaired person when performing audio mixing processing. Exemplarily, after audio mixing processing is performed on the main channel audio and the audio description, the audio mixed result is output through the headphone. When the user selects the mode that does not support watching by a visually impaired person, the electronic device does not need to consider the watching need of the visually impaired person when performing the audio mixing processing, and can output the main channel audio directly through the speaker and the headphone.

The following will discuss several specific scenarios. A television that supports a DTV service is taken as an example of the electronic device in the following scenarios.

Figure 4A:
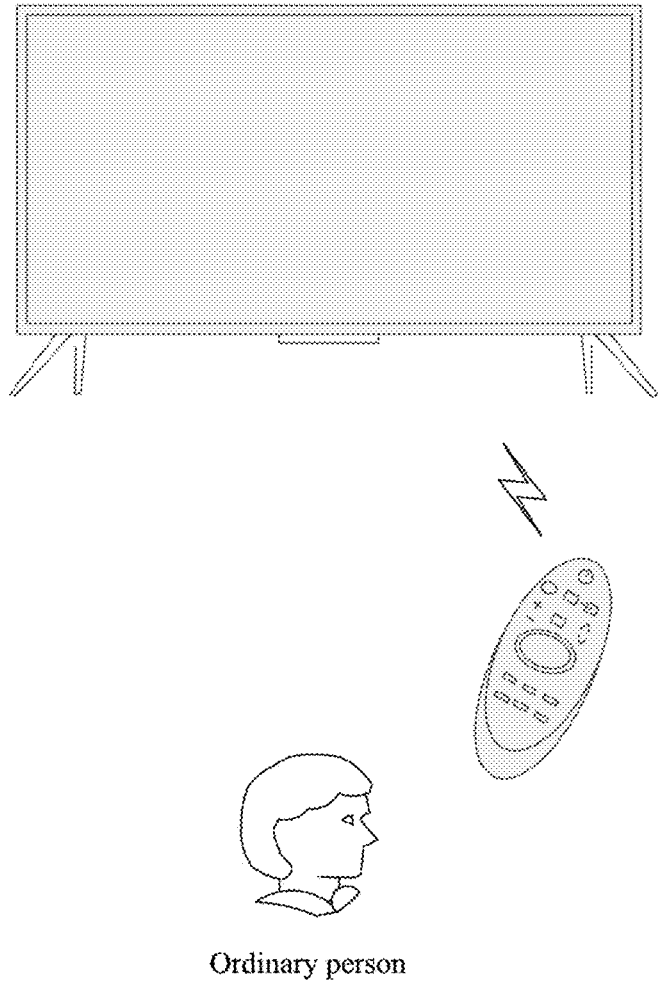
FIG. 4A is a schematic diagram of a scenario in some embodiments of the present application.
Figure 4B:
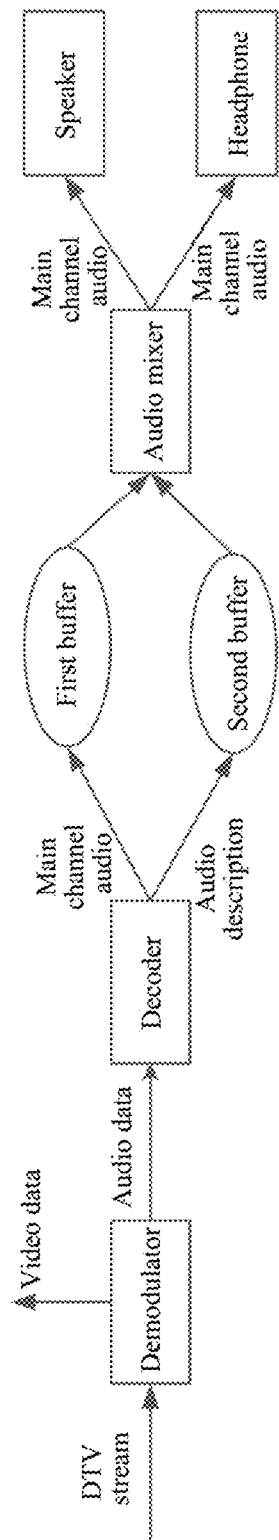
FIG. 4B is a schematic diagram of an audio and video processing in some embodiments of the present application.

FIG. 4A is a schematic diagram of a scenario in some embodiments of the present application, and FIG. 4B is a schematic diagram of an audio data processing in some embodiments of the present application. As shown in FIG. 4A, in this scenario, only an ordinary person watches a video program. In this scenario, the user sets the watch mode for the video program to the mode that does not support watching by a visually impaired person. As shown in FIG. 4B, a DTV stream of the video program is demodulated by the demodulator to obtain audio data and video data. The audio data is sent to the decoder for decoding. When the audio data includes audio description, the decoder decodes the audio data to obtain a decoding result corresponding to main channel audio and a decoding result corresponding to the audio description. When the audio data does not include the audio description, the decoder decodes the audio data to obtain the decoding result corresponding to the main channel audio. In this scenario, no matter whether the audio data includes the audio description, the audio mixer only outputs the decoding result corresponding to the main channel audio to the speaker. If headphones are connected to the electronic device, the decoding result corresponding to the main channel audio will be output to the headphone at the same time.

Figure 5A:
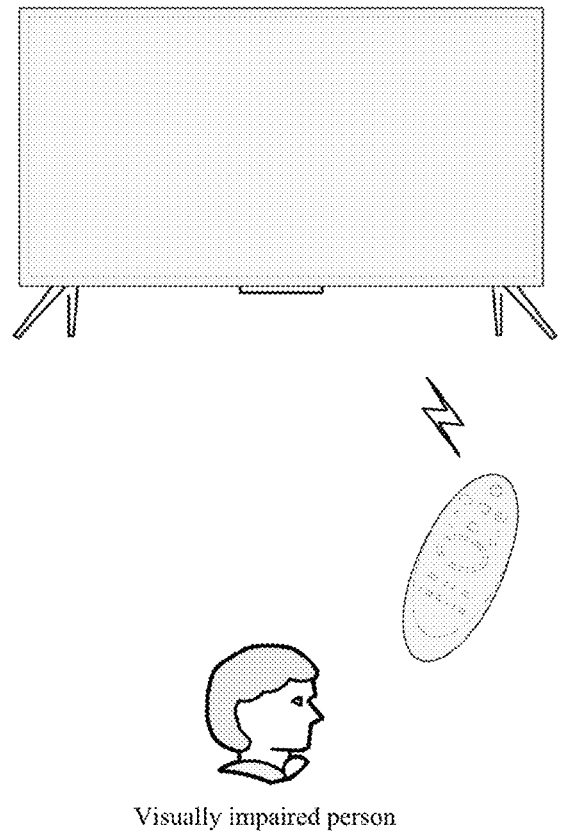
FIG. 5A is a schematic diagram of a scenario in some embodiments of the present application.
Figure 5B:
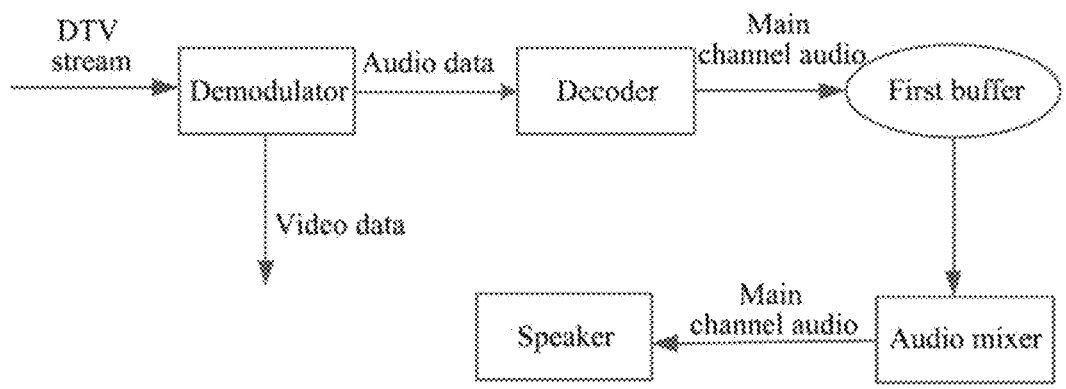
FIG. 5B is a first schematic diagram of an audio and video processing in some embodiments of the present application.
Figure 5C:
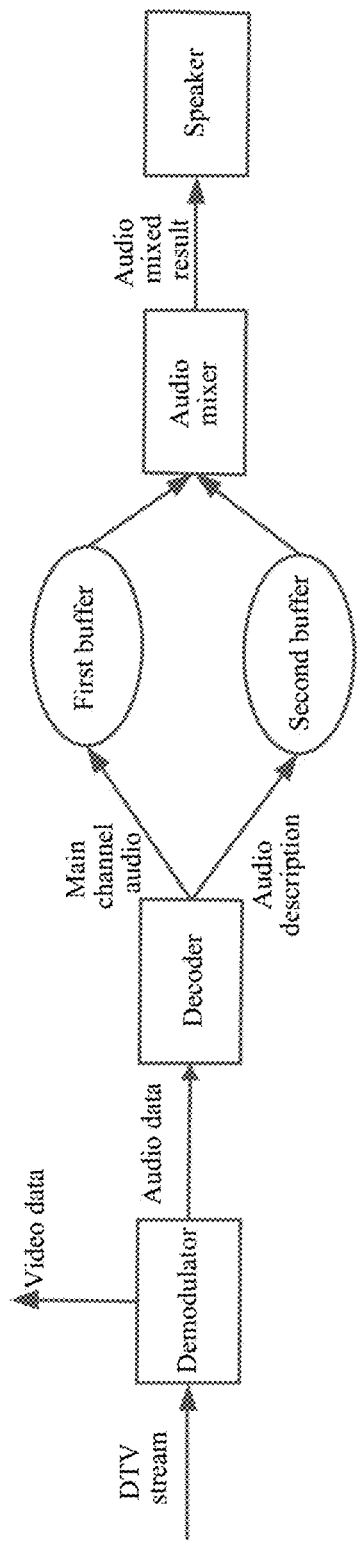
FIG. 5C is a second schematic diagram of an audio and video processing in some embodiments of the present application.

FIG. 5A is a schematic diagram of a scenario in some embodiments of the present application, FIG. 5B is a first schematic diagram of an audio data processing in some embodiments of the present application, and FIG. 5C is a second schematic diagram of an audio data processing in some embodiments of the present application. As shown in FIG. 5A, in this scenario, only a visually impaired person watches a video program, and the user is not wearing the headphone. In this scenario, the user sets the watch mode for the video program to the mode that supports watching by a visually impaired person. As shown in FIG. 5B and FIG. 5C, a DTV stream of the video program is demodulated by the demodulator to obtain audio data and video data. The audio data is sent to the decoder for decoding. As shown in FIG. 5B, when the audio data does not include audio description, the decoder decodes the audio data to obtain a decoding result corresponding to main channel audio. The audio mixer outputs the decoding result corresponding to the main channel audio to the speaker. As shown in FIG. 5C, when the audio data includes the audio description, the decoder decodes the audio data to obtain the decoding result corresponding to the main channel audio and a decoding result corresponding to the audio description. The audio mixer performs audio mixing on the decoding result corresponding to the main channel audio and the decoding result corresponding to the audio description, and then outputs an audio mixed result to the speaker.

Figure 6A:
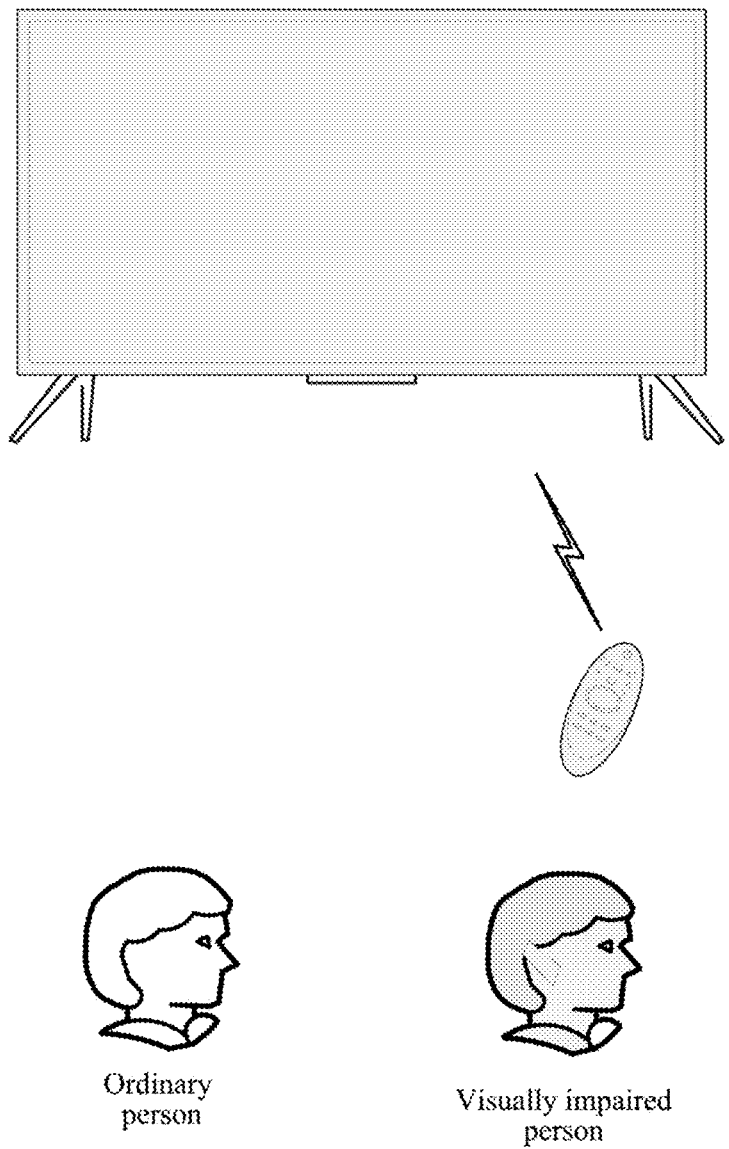
FIG. 6A is a schematic diagram of a scenario in some embodiments of the present application.
Figure 6B:
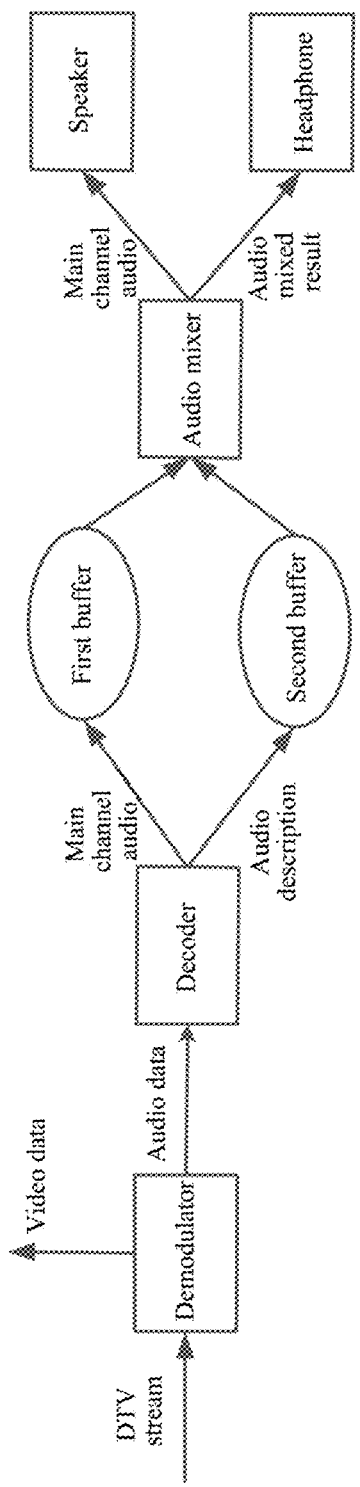
FIG. 6B is a schematic diagram of an audio and video processing in some embodiments of the present application.

FIG. 6A is a schematic diagram of a scenario in some embodiments of the present application, and FIG. 6B is a schematic diagram of an audio data processing in some embodiments of the present application. As shown in FIG. 6A, in this scenario, an ordinary person and a visually impaired person watch a video program, and the visually impaired person wears a headphone. In this scenario, the user sets the watch mode for the video program to the mode that supports watching by a visually impaired person. As shown in FIG. 6B, a DTV stream of the video program is demodulated by the demodulator to obtain audio data and video data. The audio data is sent to the decoder for decoding. The decoder decodes the audio data to obtain a decoding result corresponding to main channel audio and a decoding result corresponding to audio description. The audio mixer outputs the decoding result corresponding to the main channel audio to the speaker, performs audio mixing on the decoding result corresponding to the main channel audio and the decoding result corresponding to the audio description, and outputs an audio mixed result to the headphone.

Figure 7A:
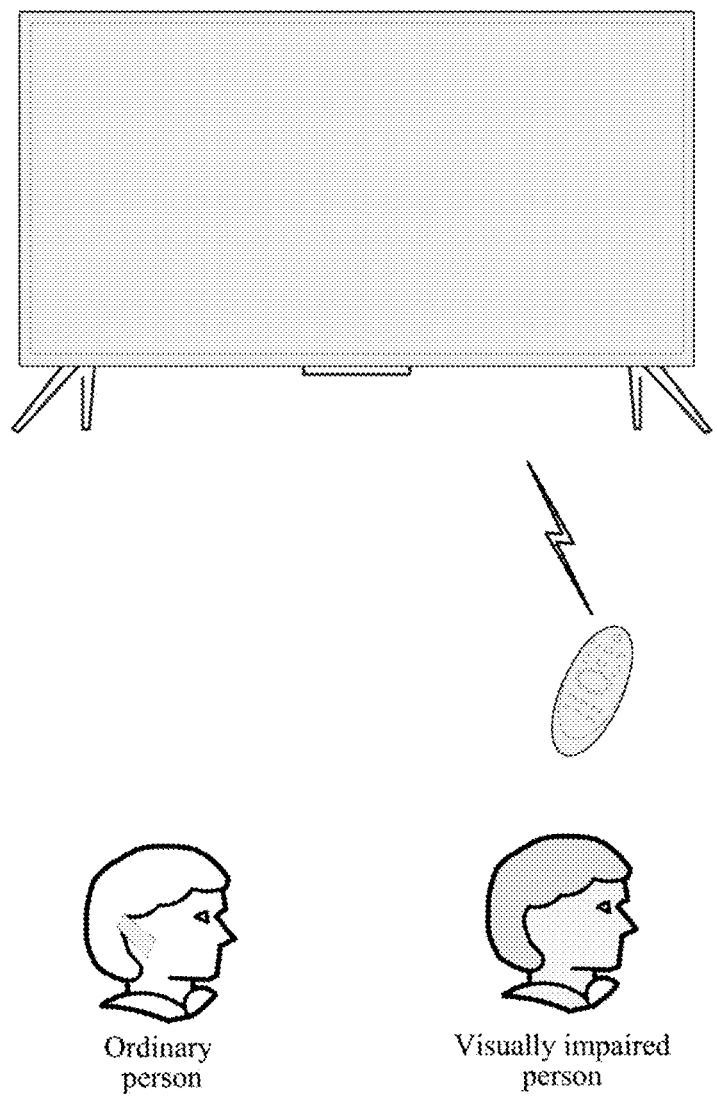
FIG. 7A is a schematic diagram of a scenario in some embodiments of the present application.
Figure 7B:
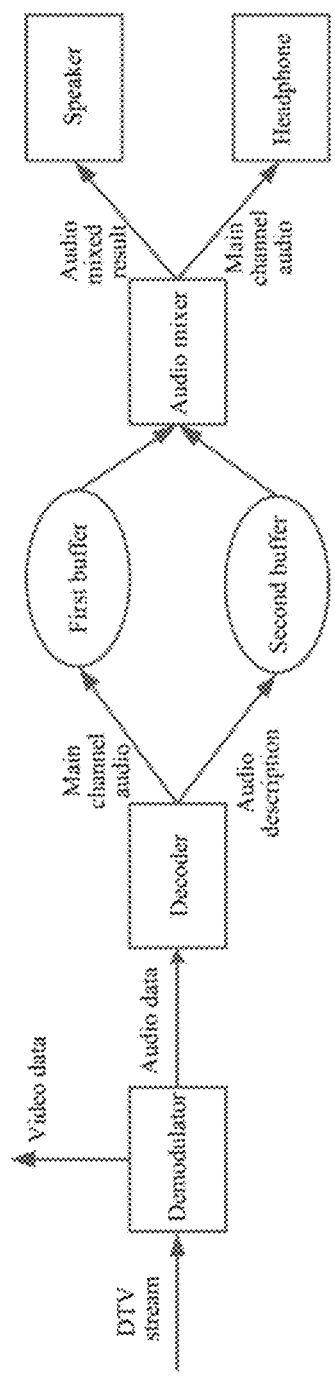
FIG. 7B is a schematic diagram of an audio and video processing in some embodiments of the present application.

FIG. 7A is a schematic diagram of a scenario in some embodiments of the present application, and FIG. 7B is a schematic diagram of an audio data processing in some embodiments of the present application. As shown in FIG. 7A, in this scenario, an ordinary person and a visually impaired person watch a video program, and the ordinary person wears headphones. In this scenario, the user sets the watch mode for the video program to the mode that supports watching by a visually impaired person. As shown in FIG. 7B, a DTV stream of the video program is demodulated by the demodulator to obtain audio data and video data. The audio data is sent to the decoder for decoding. The decoder decodes the audio data to obtain a decoding result corresponding to main channel audio and a decoding result corresponding to audio description. The audio mixer outputs the decoding result corresponding to the main channel audio to the headphones, performs audio mixing on the decoding result corresponding to the main channel audio and the decoding result corresponding to the audio description, and outputs an audio mixed result to the speaker.

It can be seen that the audio processing method of some embodiments can satisfy the watching needs of an ordinary person and a visually impaired person in different application scenarios. Especially in a scenario where a visually impaired person and an ordinary person watch at the same time, it can be realized that the two do not interfere with each other, improving the watching experience of various users.

In some embodiments, the present application also provides an audio processing method, including: receiving an audio and video file, where the audio and video file includes main channel audio and audio description, where the main channel audio is audio data of the audio and video file itself, and the audio description is audio data describing content of a video image in the audio and video file; when a headphone is connected, controlling the headphone to output the main channel audio and the audio description, and controlling a speaker to output the main channel audio; and when no headphone is connected, controlling the speaker to output the main channel audio and the audio description.

Figure 8:
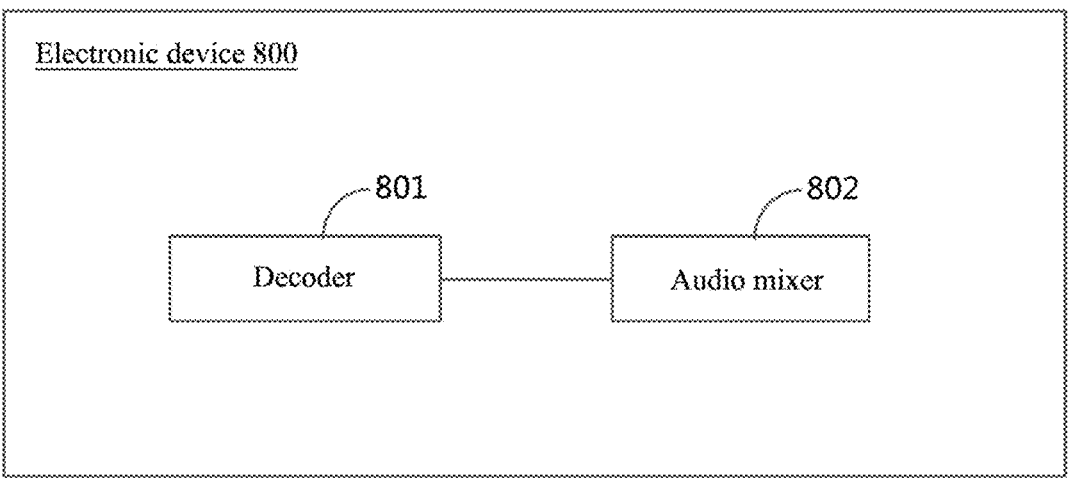
FIG. 8 is a first schematic structural diagram of an electronic device according to some embodiments of the present application.

FIG. 8 is a first schematic structural diagram of an electronic device according to some embodiments of the present application. The electronic device of some embodiments may be any electronic device that supports multimedia playing. In some embodiments, the electronic device is a television.

As shown in FIG. 8, an electronic device 800 of some embodiments includes a decoder 801 and an audio mixer 802.

The decoder 801 is configured to acquire a first decoding result corresponding to main channel audio and a second decoding result corresponding to audio description according to audio data in an audio and video file, where the main channel audio is audio data of the audio and video file itself, and the audio description is audio data describing content of a video image in the audio and video file.

The audio mixer 802 is configured to output the first decoding result as well as an audio mixed result of the first decoding result and the second decoding result respectively through different audio output devices.

The electronic device of some embodiments can be used to execute the technical solutions of the method embodiments shown in FIG. 2 above, and implementation principles and technical effects thereof are similar, which will not be repeated here.

Figure 9:
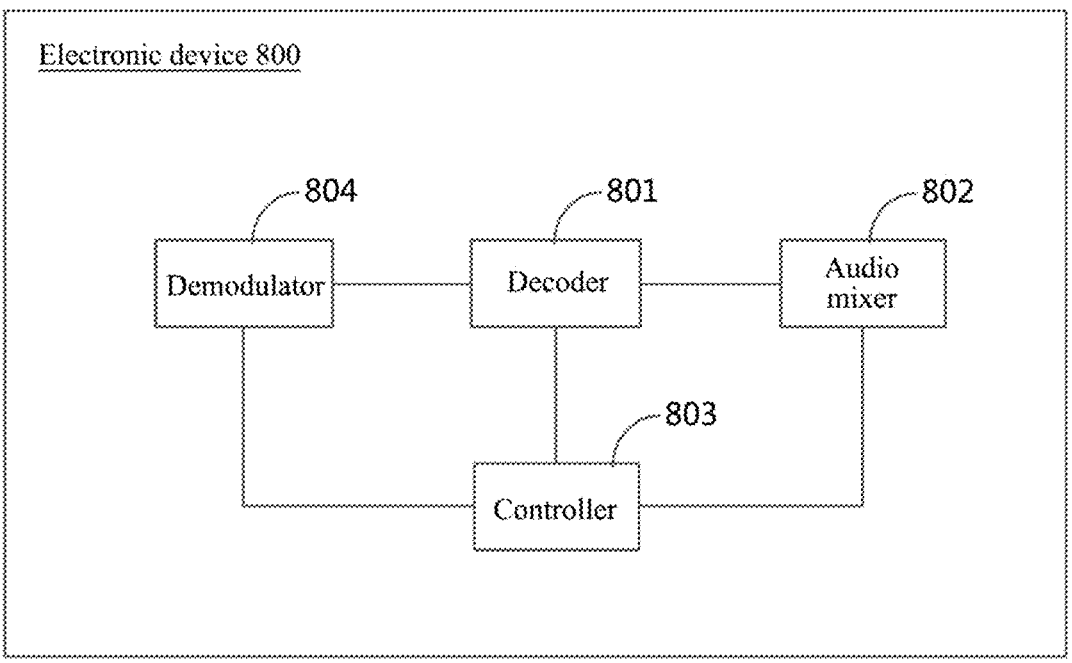
FIG. 9 is a second schematic structural diagram of an electronic device according to some embodiments of the present application.

FIG. 9 is a second schematic structural diagram of an electronic device according to some embodiments of the present application. As shown in FIG. 9, an electronic device 800 of some embodiments can further include a controller 803 and a demodulator 801.

In some embodiments, the audio output devices include a speaker and a headphone or an earphone, and the controller 803 is configured to determine whether the earphone or headphone is connected to the electronic device.

The audio mixer 802 is specifically configured to, if the headphone is connected to the electronic device, output the audio mixed result of the first decoding result and the second decoding result through the earphone or headphone, and output the first decoding result through the speaker.

In some embodiments, the decoder 801 is configured to decode the audio data in the audio and video file to obtain the first decoding result corresponding to the main channel audio and the second decoding result corresponding to the audio description, and store the first decoding result in a first buffer and store the second decoding result in a second buffer.

In some embodiments, the audio mixer 802 is configured to:
  acquire the first decoding result from the first buffer, and send the first decoding result to the speaker;
  if the second buffer is not empty, acquire the second decoding result from the second buffer, perform audio mixing on the first decoding result and the second decoding result, and send an obtained audio mixed result to the headphone.

In some embodiments, the decoder 801 is configured to perform analysis on the audio data in the audio and video file according to a protocol, and determine that the audio data includes the main channel audio and the audio description.

In some embodiments, the controller 803 is further configured to acquire a current watch mode for the audio and video file, and determine that the current watch mode is a mode supporting watching by a visually impaired person.

In some embodiments, the electronic device further includes: a demodulator, configured to:
  acquire a stream of the audio and video file; and
  demodulate the stream to obtain video data and the audio data in the audio and video file.

In some embodiments, some embodiments of the present application also provide an electronic device, including, a speaker; and a processor connected to the speaker, where the processor is configured to: receive an audio and video file, where the audio and video file includes main channel audio and audio description, where the main channel audio is audio data of the audio and video file itself, and the audio description is audio data describing content of a video image in the audio and video file; when earphones or headphones are connected, control the earphones or headphones to output the main channel audio and the audio description, and control the speaker to output the main channel audio; and when no earphone or headphone is connected, control the speaker to output the main channel audio and the audio description.

In some embodiments, when the earphone or headphone is connected, controlling the earphone or headphone to output the main channel audio and the audio description, and controlling the speaker to output the main channel audio, includes: acquiring a first decoding result corresponding to the main channel audio and a second decoding result corresponding to the audio description according to audio data in the audio and video file; when the headphone is connected, outputting an audio mixed result of the first decoding result and the second decoding result through the headphone, and outputting the first decoding result through the speaker.

In some embodiments, when no earphone or headphone is connected, controlling the speaker to output the main channel audio and the audio description includes: acquiring the first decoding result corresponding to the main channel audio and the second decoding result corresponding to the audio description according to the audio data in the audio and video file; when no earphone or headphone is connected, outputting the audio mixed result of the first decoding result and the second decoding result through the speaker.

In some embodiments, the processor includes a controller, a decoder and an audio mixer. The processor controls earphones or headphones to output the main channel audio and the audio description and controls the speaker to output the main channel audio when the earphone or headphone is connected, and controls the speaker to output the main channel audio and the audio description when no earphone or headphone is connected, includes that: the decoder acquires the first decoding result corresponding to the main channel audio and the second decoding result corresponding to the audio description according to the audio data in the audio and video file; when the earphone or headphone is connected, the controller controls the audio mixer to output the audio mixed result of the first decoding result and the second decoding result through the earphone or headphone, and output the first decoding result through the speaker; when no earphone or headphone is connected, the controller controls the audio mixer to output the audio mixed result of the first decoding result and the second decoding result through the speaker.

In some embodiments, the electronic device further includes a first buffer and a second buffer, where the first buffer is configured to buffer the first decoding result, and the second buffer is configured to buffer the second decoding result.

In some embodiments, the present application also provides an electronic device, including: a speaker; and a processor connected to the speaker, where the processor is configured to: receive an audio and video file, where the audio and video file includes main channel audio and audio description, where the main channel audio is audio data of the audio and video file itself, and the audio description is audio data describing content of a video image in the audio and video file; when an earphone or a headphone is connected, control an output of the earphone or headphone according to the main channel audio and the audio description, and control an output of the speaker according to the main channel audio; and when no earphone or headphone is connected, control the output of the speaker according to the main channel audio and the audio description.

An embodiment of the present application also provides an electronic device, including: a processor and a memory; where the memory is configured to store computer programs; and the processor is configured to execute the computer programs stored in the memory to implement the audio processing methods of the above-mentioned embodiments. Specifically, the relevant description can refer to the foregoing embodiments.

In some embodiments, the memory may be independent or may be integrated with the processor.

When the memory is a device independent of the processor, the electronic device may further include: a bus for connecting the memory and the processor.

The electronic device according to some embodiments can be used to execute the technical solution in any one of the foregoing embodiments, and implementation principles and technical effects thereof are similar. Some embodiments will not be repeated here.

Some embodiments of the present application also provide a computer-readable storage medium, where the computer-readable storage medium includes computer programs, and the computer programs are configured to implement the technical solution in any one of the above embodiments.

Some embodiments of the present application also provide a chip, including: a memory, a processor and computer programs, where the computer programs are stored in the memory, and the processor is configured to run the computer programs to execute the technical solution in any one of the above embodiments.

In the embodiments of the present application, it should be understood that the disclosed devices and methods may be implemented in other ways. The device embodiments described above are only illustrative. For example, the division of the modules is only a logical function division. In an actual implementation, there may be another division manner. For example, multiple modules may be combined, or may be integrated into another system, or some features may be omitted or not executed. In addition, the shown or discussed connection between each other or direct connection or communication may be an indirect connection or communication through some interfaces, apparatuses or modules, and may be in electrical, mechanical or other forms.

The modules described as individual components may be or may not be physically separated, and the components shown as modules may be or may not be physical units, that is, they may be located in one place, or may be distributed in multiple network units. Some or all of the modules may be selected according to actual needs to implement purposes of solutions of some embodiments.

In addition, the functional modules in the embodiments of the present application may be integrated into one processing unit, or each module may physically exist alone, or two or more modules may be integrated into one unit. The above modularized units may be implemented in a form of hardware, or implemented in a form of hardware and software functional units.

The above-mentioned integrated modules implemented in the form of software functional modules may be stored in a computer-readable storage medium. The above-mentioned software functional modules are stored in a storage medium, including instructions to cause a computer (which may be a personal computer, a server, or a network device, etc.) or a processor to execute part of the steps of the methods in the various embodiments of the present application.

It should be understood that the foregoing processor may be a Central Processing Unit (CPU), or other general-purpose processor, Digital Signal Processor (DSP), Application Specific Integrated Circuit (ASIC), etc. The general-purpose processor may be a microprocessor or the processor may also be any conventional processor and the like. The steps of the methods disclosed in combination with the application can be directly embodied as being executed and completed by a hardware processor, or being executed and completed by a combination of hardware and software modules in the processor.

The memory may include a high-speed RAM memory, and may also include a non-volatile memory NVM, such as at least one disk memory, and may also be a U disk, a mobile hard disk, a read-only memory, a magnetic disk, an optical disk, or the like.

The bus may be an Industry Standard Architecture, ISA bus, a Peripheral Component Interconnect (PCI) bus, or an Extended Industry Standard Architecture (EISA) bus, etc. The bus can be divided into an address bus, a data bus, a control bus and so on. For ease of illustration, the bus in the accompanying drawings of the present application is not limited to only one bus or one type of buses.

The above-mentioned storage medium may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The storage medium may be any available medium that can be accessed by a general-purpose or special-purpose computer.

What is claimed is:

1. An electronic device, comprising:
    a speaker; and
    a processor connected to the speaker,
    wherein the processor is configured to:
    receive an audio and video file, wherein the audio and video file comprises main channel audio and audio description;
    cause the electronic device to output the main channel audio and the audio description to a headphone, and cause the electronic device to output the main channel audio to the speaker in a scenario where a normal user and a visually impaired user watch the audio and video file at the same time and the visually impaired user wears the headphone; and
    in response to no headphone being connected to the electronic device, cause the electronic device to output the main channel audio and the audio description to the speaker;
    wherein the electronic device comprises a decoder, and the processor is further configured to:
    cause the decoder to decode the audio and video file to obtain a first decoding result corresponding to the main channel audio and a second decoding result corresponding to the audio description;

wherein the electronic device further comprises a first buffer and a second buffer, the processor is further configured to:

cause the decoder to store the first decoding result to the first buffer, and store the second decoding result to the second buffer;

wherein the electronic device further comprises a mixer, the processor is further configured to cause the electronic device to:

cause the mixer to obtain the first decoding result from the first buffer, cause the mixer to obtain the second decoding result from the second buffer in response to the second buffer not being empty, and mix the first decoding result and the second decoding result to obtain a mixed result and send the mixed result to the headphone.

2. The electronic device according to claim 1, wherein the processor is further configured to:

determine whether one or more external devices which have established Bluetooth connections with the electronic device comprise a headphone.

3. The electronic device according to claim 1, wherein the processor is further configured to cause the electronic device to cause the mixer not obtain the second decoding result in response to the second buffer being empty, and send the first decoding result directly to the headphone.

4. The electronic device according to claim 1, wherein the processor is further configured to:

cause the decoder to analyze audio and video data in the audio and video file according a protocol and determine whether the audio and video data has audio description;

in response to the audio and video data not having audio description, cause the decoder to skip decoding of audio description.

5. A method for processing audio and video data comprising:

receiving an audio and video file, wherein the audio and video file comprises main channel audio and audio description;

causing a processor of an electronic device to output the main channel audio and the audio description to a headphone, and causing the electronic device to output the main channel audio to a speaker in a scenario where a normal user and a visually impaired user watch the audio and video file at the same time and the visually impaired user wears the headphone; and in response to no headphone being connected to the electronic device, causing the electronic device to output the main channel audio and the audio description to the speaker;

causing a decoder to decode the audio and video file to obtain a first decoding result corresponding to the main channel audio and a second decoding result corresponding to the audio description;

determining whether one or more external devices which have established Bluetooth connections with the electronic device comprise a headphone;

causing the decoder to analyze audio and video data in the audio and video file according to a protocol and determining whether the audio and video data has audio description; in response to the audio and video data not having audio description, causing the decoder to skip decoding of audio description.

6. The method according to claim 5, further comprising:

causing the decoder to store the first decoding result to a first buffer, and store the second decoding result to a second buffer.

7. The method according to claim 6, further comprising:

causing a mixer of the electronic device to obtain the first decoding result from the first buffer, causing the mixer to obtain the second decoding result from the second buffer in response to the second buffer not being empty, and mixing the first decoding result and the second decoding result to obtain a mixed result and sending the mixed result to the headphone.

8. The method according to claim 6, further comprising:

causing a mixer of the electronic device to obtain the first decoding result from the first buffer, causing the mixer not obtain the second decoding result in response to the second buffer being empty, and sending the first decoding result directly to the headphone.

* * * * *